United States Patent [19]
Fukuchi

[11] Patent Number: 5,245,457
[45] Date of Patent: Sep. 14, 1993

[54] FORMING A TOPCOAT FOR LIQUID CRYSTAL DISPLAY DEVICES HAVING PLASTIC SUBSTRATES USING UV LIGHT AND TEMPERATURES LESS THAN 200° C.

[75] Inventor: Shunsei Fukuchi, Nara, Japan

[73] Assignee: Sharp Kabushiki Kaisha, Osaka, Japan

[21] Appl. No.: 863,171

[22] Filed: Apr. 3, 1992

[30] Foreign Application Priority Data

Apr. 4, 1991 [JP] Japan .................. 3-071476

[51] Int. Cl.⁵ .......................................... G02F 1/1333
[52] U.S. Cl. .................................. 359/79; 359/74
[58] Field of Search ............................ 359/79, 74

[56] References Cited

U.S. PATENT DOCUMENTS

| | | | |
|---|---|---|---|
| 4,278,328 | 7/1981 | Mukoh et al. | 359/79 |
| 4,812,018 | 3/1989 | Kobayashi | 359/79 |
| 4,932,757 | 6/1990 | Hanyu et al. | 359/79 |
| 5,153,755 | 10/1992 | Higa | 359/79 |

FOREIGN PATENT DOCUMENTS

| | | | |
|---|---|---|---|
| 55-164812 | 12/1980 | Japan | 359/79 |
| 57-58122 | 4/1982 | Japan | 359/79 |
| 60-211432 | 10/1985 | Japan | 359/74 |
| 1-161215 | 6/1989 | Japan | 359/79 |
| 1-169426 | 7/1989 | Japan | 359/74 |
| 2-000013 | 1/1990 | Japan | 359/74 |

Primary Examiner—William L. Sikes
Assistant Examiner—Anita Pellman Gross

[57] ABSTRACT

A liquid crystal display device has a pair of transparent plastic substrates. Electrodes formed on an inner side of each substrate is covered with a topcoat and electrically and physically protected thereby. This topcoat has been formed by first applying a silica coating ink (e.g., MOF Si film or Ti-Si film made by Tokyo Oka K.K.) over the electrodes as a material of the topcoat, then irradiating the silica coating ink with ultraviolet light to evaporate a high-boiler solvent in the silica coating ink, and then baking the silica coating ink at a temperature of 200° C. or lower.

6 Claims, 2 Drawing Sheets

FORMING A TOPCOAT FOR LIQUID CRYSTAL DISPLAY DEVICES HAVING PLASTIC SUBSTRATES USING UV LIGHT AND TEMPERATURES LESS THAN 200° C.

BACKGROUND OF THE INVENTION

1. Field of the Invention

The present invention relates to a liquid crystal display device suitable for use in electronic notebooks, personal computers, wordprocessors, or the like and more particularly, to a method of forming a topcoat that electrically and physically protects electrodes of such liquid crystal display devices.

2. Description of the Prior Art

Most of the liquid crystal display devices are fabricated, as shown in FIG. 4, by providing a bottom coat (a $SiO_2$ film) 12, ITO (tin-added indium oxide) electrodes 13, a topcoat 14, and an orientation film (polyimide film) 15 on the inner surface of each of two glass substrates 11, 11, and then filling liquid crystals 17 into the cell gap therebetween. In the figure, designated by reference numerals 10 and 16 are polarizing plates and sealing material, respectively. The bottom coats 12 serve for preventing impurities (e.g. Na) in the glass substrates 11 from moving toward the liquid crystals 17. The topcoats 14, on the other hand, serve for protecting the ITO electrodes 13 electrically and physically when conductive foreign matters of the size equivalent to the above-mentioned cell gap have entered the liquid crystal layer 17, thereby preventing any leak faults.

Conventionally, the topcoats 14 have been formed of a material resulting from dissolving a prepolymer (or monomers), which is composed of Si (or Si and Ti) and either a hydroxyl group (—OH) or alkoxy group (—OR) added thereto, into a high-boiler solvent such as normal methylpyrolidone or dimethylacetamide at a solid ratio of 3 to 10% by weight (hereinafter, the material is referred to as "silica coating ink" or simply as "ink." Such one commercially available is, for example, MOF, Si film or Ti-Si film made by Tokyo Oka Kogyo K.K.). Then this silica coating ink is printed onto the ITO electrodes 13 by a relief-printing technique, and thereafter calcined or baked at a temperature of 250° to 350° C., thus forming the topcoats 14. That is, the silica coating ink is dehydrated and condensed to generate —Si—O—Si— or —Ti—O—Ti— (e.g., reaction from silanol to siloxane), the ink thus being oxidized. This imparts insulating property and hardness to the topcoats 14.

It is to be noted that although a temperature of 500° C. is required to obtain a perfect dehydration and condensation reaction, a baking temperature of 250° C. will do for the topcoats 14 of liquid crystal display devices.

Liquid crystal display devices used especially in electronic notebooks, personal computers, wordprocessors, or the like are required to be lightweight and thin, and also to have a high shock resistance.

To satisfy such requirements, it is desirable to use plastic substrates (e.g., polyether sulfone (PES), polyethylene terephthalate (PET), allyl diglycol carbonyl (ADC), or acrylic resins) instead of the glass substrates 11. In this case, since the plastic substrate does not have a heat resistance against temperatures of more than 200° C., the baking temperature should be limited to 200° C. or lower accordingly. However, if simply the baking temperature is set to 200° C. or lower, the above-mentioned dehydration and condensation reaction will not progress satisfactorily, with the result that the hydroxyl group (—OH), or alkoxy group (—OR) and the solvent remain within the topcoats 14. This makes it impossible to ensure the insulating property and hardness for protecting the electrodes 13, disadvantageously.

SUMMARY OF THE INVENTION

The primary object of the present invention is therefore to provide a topcoat forming method for a liquid crystal display device, which does not require baking temperatures of higher than 200° C. so as to be applicable to the fabrication of a liquid crystal display device having plastic substrates and which can offer topcoats having a sufficient insulating property and hardness to protect the transparent electrodes.

In order to achieve the aforementioned objective, according to the present invention, after transparent electrodes are formed on one side of a substrate of a liquid crystal display, a topcoat for electrically and physically protecting the transparent electrodes are formed by the following steps of:

a) applying a silica coating ink over the electrodes as a material of the topcoat after the electrodes are formed on the substrates;

b) irradiating the silica coating ink with ultraviolet light to remove a high-boiler solvent contained in the silica coating ink; and c) baking the silica coating ink having been irradiated with ultraviolet light at a first temperature of 200° C. or lower.

Preferably, the silica coating ink is preliminarily baked between the steps of a) and b) at a temperature which is lower than said first temperature.

It is to be noted that the silica coating ink used herein is defined as a material resulting from dissolving a prepolymer (or monomers), which is composed of Si (or Si and Ti) and either a hydroxyl group (—OH) or alkoxy group (—OR) added thereto, into a high-boiler solvent such as normal methylpyrolidone or dimethylacetamide at a solid ratio of 3 to 10% by weight.

In the process of irradiating the silica coating ink with ultraviolet light, the high-boiler solvent in the ink is removed by the energy of the ultraviolet light. This serves to facilitate the intermolecular association among the remaining solid components. (The dehydration and condensation reaction progresses to some extent.) Accordingly, even if the baking temperature is lower than 200° C., for example 170° C., the dehydration and condensation of the ink are carried out sufficiently. As a result, the topcoats are given sufficient insulating property and hardness to protect the transparent electrodes electrically and physically. Accordingly, when plastic substrates are used as the transparent substrates, it is possible to prepare liquid crystal display devices without causing any thermal deterioration in the plastic substrates.

Moreover, when the silica coating ink is preliminarily baked at a temperature lower than the aforementioned baking temperature prior to the ultraviolet treatment, the high-boiler solvent evaporates to some extent with the result that the viscosity of the ink is increased. Therefore, in the next process of irradiating the ink with ultraviolet light, the ink is unlikely to flow and the substrates can be handled more easily.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
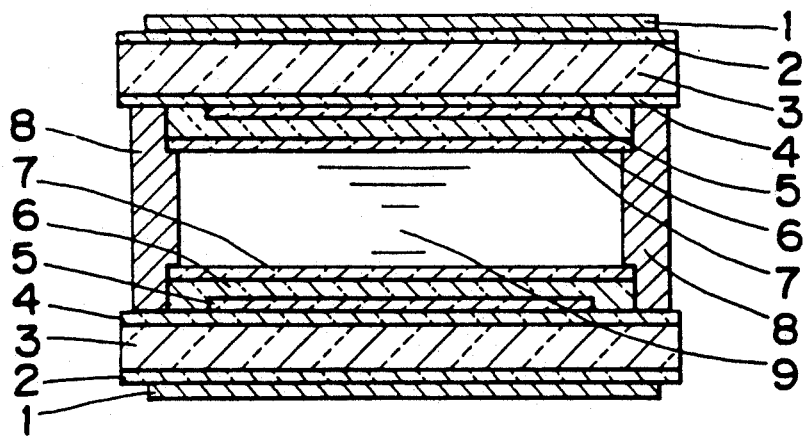
FIG. 1 is a sectional view showing a liquid crystal display device fabricated by a method in accordance with the present invention.

The following description takes the case where a liquid crystal display device using a pair of plastic substrates 3, 3, as shown in FIG. 1, is fabricated.

First prepared is a plastic substrate 3 having on its top and bottom surfaces hard coats (wear-resistant coating) 4, 2 composed of an acrylic or silicon resin. On the hard coat 4 formed on the top surface of the plastic substrate 3, transparent electrodes 5 composed of a tin-added indium oxide (ITO) are formed in a pattern by first forming a transparent ITO conductive film by a chemical vapor deposition method and then etching the film into a desired pattern. Next a silica coating ink commercially available (Ti-Si film made by Tokyo Oka K.K., for example) is applied to the surface of the ITO electrodes 5 as a material of topcoat 6 at a thickness of 500 to 1500 Å using an offset press. Then the plastic substrate 3, to which the silica coating ink has been applied, is preliminarily baked for some few minutes at a temperature of 70° C. This causes the high-boiler solvent in the ink to evaporate to some extent with viscosity of the ink increased, thereby preventing the ink from flowing on the substrate 3. Next, the preliminarily baked silica coating ink is irradiated with ultraviolet light for 5 minutes by means of a low-pressure mercury lamp (e.g., model name: KAH-05303, 500 W, 3-lamp type, made by Toshiba Raitech K.K.). Instead of the low-pressure lamp, it is also possible to use a high-pressure mercury lamp (e.g., a metal halide high-pressure mercury lamp made by Ishizaki Denki K.K.), although an irradiation time two or more times as long is required. Subsequently, the substrate 3 with the silica coating ink treated with UV is baked for an hour at a temperature of 170° C. In this process, even the baking temperature of 170° C. (lower than 200° C.) allows the ink to be dehydrated and condensed sufficiently. This is because the high-boiler solvent in the ink has been already removed by the UV irradiation and this facilitates the molecular association of the remaining solid components. Thus, the topcoat 6 having a sufficient insulating property and hardness to protect the ITO electrode 5 can be formed without causing any thermal deterioration in the plastic substrate 3. Thereafter, an orientation coat 7 is placed on the surface of the topcoat 6. Finally, the plastic substrate 3 is placed opposite to another plastic substrate 3 fabricated in the same manner as the above, liquid crystals 9 are sealed therebetween using a sealing material 8, and polarizing plates 1 are provided, thus completing the fabrication of the liquid crystal display device having the plastic substrates.

Figure 2:
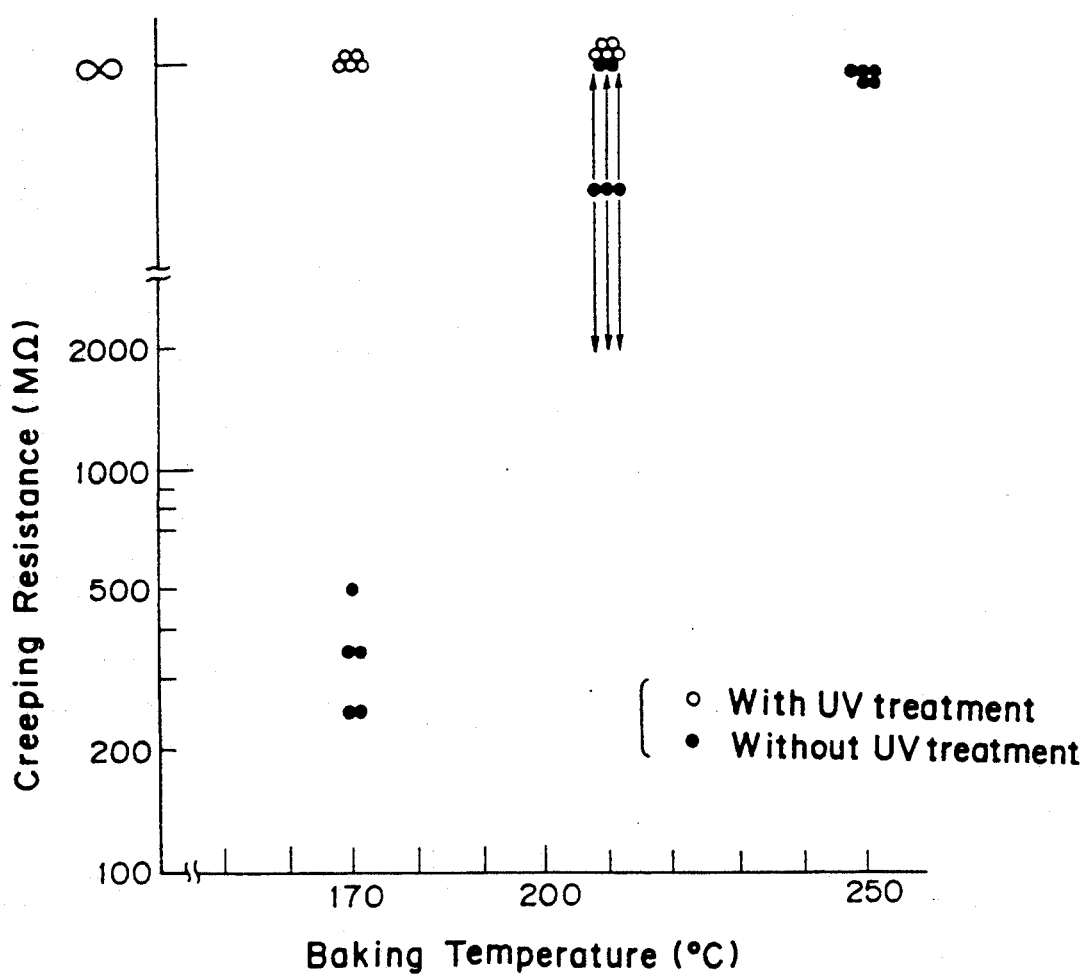
FIG. 2 is a diagram showing data that represent the insulating property of topcoats, ones treated with UV light and the others not treated with UV light.

To evaluate the insulating property of the topcoat 6, there were prepared samples with preparation conditions (i.e. irradiation or non-irradiation of ultraviolet light and baking temperature) changed. These samples were measured with respect to the creeping resistance between the adjacent ITO electrodes 5 in a pattern (the distance between the adjacent electrodes in a pattern is 50 μm). Measurement results obtained are as shown in FIG. 2. In FIG. 2, the mark 0 represents data of samples treated with ultraviolet light as described above, while the mark ● represents data of comparison samples not having undergone the ultraviolet light treatment. As seen from the figure, the comparison samples show a creeping resistance of infinity when the baking temperature is 250° C.; however, as the baking temperature decreases to 200° C. to 170° C., the resulting creeping resistance becomes finite lower values. Unlike the comparison samples, the samples treated with ultraviolet light show a creeping resistance of infinity ∞ even when the baking temperature is 170° C., thus yielding a successful result.

Figure 3:
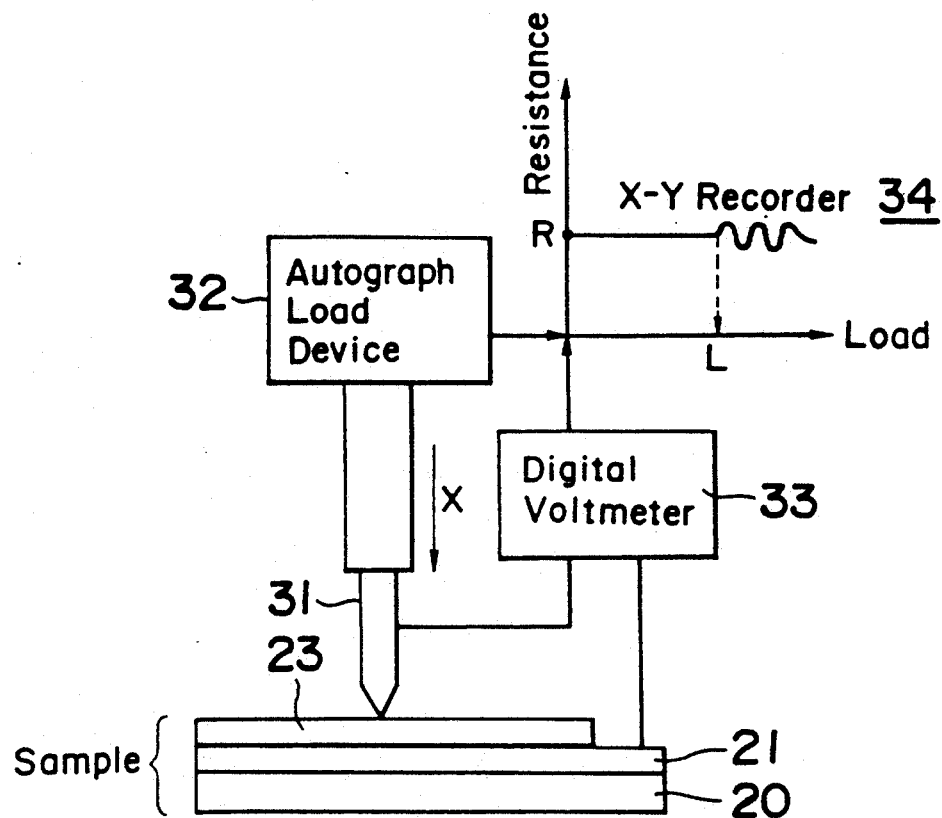
FIG. 3 is a view showing a measuring system used for evaluating the hardness of the topcoats.
Figure 4:
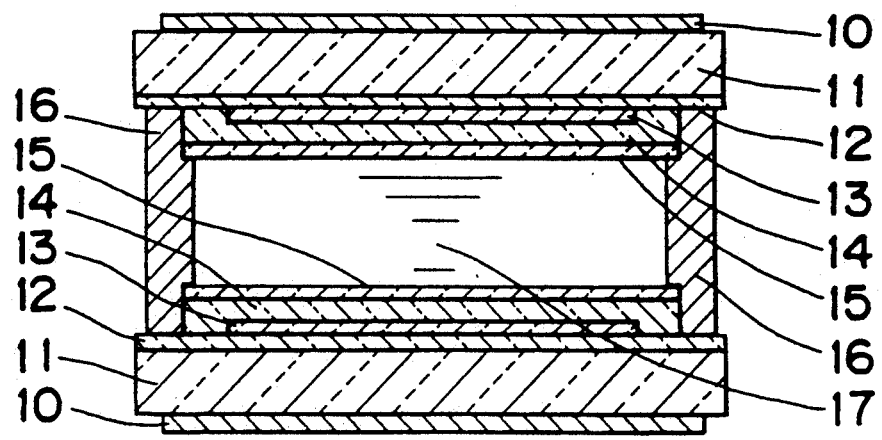
FIG. 4 is a sectional view showing a prior-art liquid crystal display device having glass substrates.

Next, to evaluate the hardness of the topcoat, there were prepared samples wherein an ITO electrode 21 and a topcoat (with preparation conditions changed as described above) 23 were formed on a glass substrate 20, as shown in FIG. 3. With these samples, while a load was being applied to the topcoat 23 in a direction 'x' by a needle-like load transmission portion 31 of an autograph load device 32, an electrical resistance R between the load transmission portion 31 and the ITO electrode 21 was measured by a digital voltmeter 33. In this case, an X-Y recorder 34 was set so that the X-axis represented the load and the Y-axis, the electrical resistance. With this arrangement, as the load was made to increase, a point L (leak point) was detected at which the topcoat 23 was burst out and thereby the electrical resistance R changed. As a result of this measurement, the topcoat according to the present invention showed a hardness equal to that of a topcoat formed under the conventional conditions (more specifically, non-irradiation of ultraviolet light and baking at a temperature of 250° C.).

In addition, the present invention is not limited to using plastic substrates, but glass substrates may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
   a pair of transparent substrates each formed of a plastic film, said substrates sandwiching liquid crystals therebetween;
   transparent electrodes formed in a pattern on an inner side of each substrate;
   a topcoat having an insulating property and hardness sufficient to electrically and physically protect the electrodes, said topcoat being formed by first applying a silica coating ink over the electrodes as a material of the topcoat, then irradiating the silica coating ink with ultraviolet light, and then baking said silica coating ink having been irradiated with ultraviolet light at a temperature of 200° C. or lower; and an orientation film formed on each topcoat for orientating the liquid crystals.

2. The liquid crystal display device as claimed in claim 1, wherein said silica coating ink over the electrodes on each substrate is preliminarily baked at a temperature lower than the first temperature prior to the irradiation with ultraviolet light.

3. A method of forming a topcoat for electrically and physically protecting transparent electrodes of a liquid crystal display device, said transparent electrodes being formed in a pattern on an inner side of each of opposing transparent substrates between which liquid crystals are sandwiched, comprising steps of:

applying a silica coating ink over the electrodes as a material of the topcoat after the electrodes are formed on the substrates;

irradiating the silica coating ink with ultraviolet light to remove a high-boiler solvent contained in the silica coating ink; and baking the silica coating ink having been irradiated with ultraviolet light at a first temperature of 200° C. or lower.

4. The method as claimed in claim 3, further having a step of preliminarily baking the silica coating ink over the electrodes prior to the step of irradiating the silica coating ink with ultraviolet light, at a temperature which is lower than said first temperature.

5. The method as claimed in claim 4, wherein the temperature for preliminarily baking the silica coating ink is 70° C., and the first temperature is 170° C.

6. The method as claimed in claim 3, wherein the substrates are each formed of a plastic film.

* * * * *